Patented Mar. 11, 1947

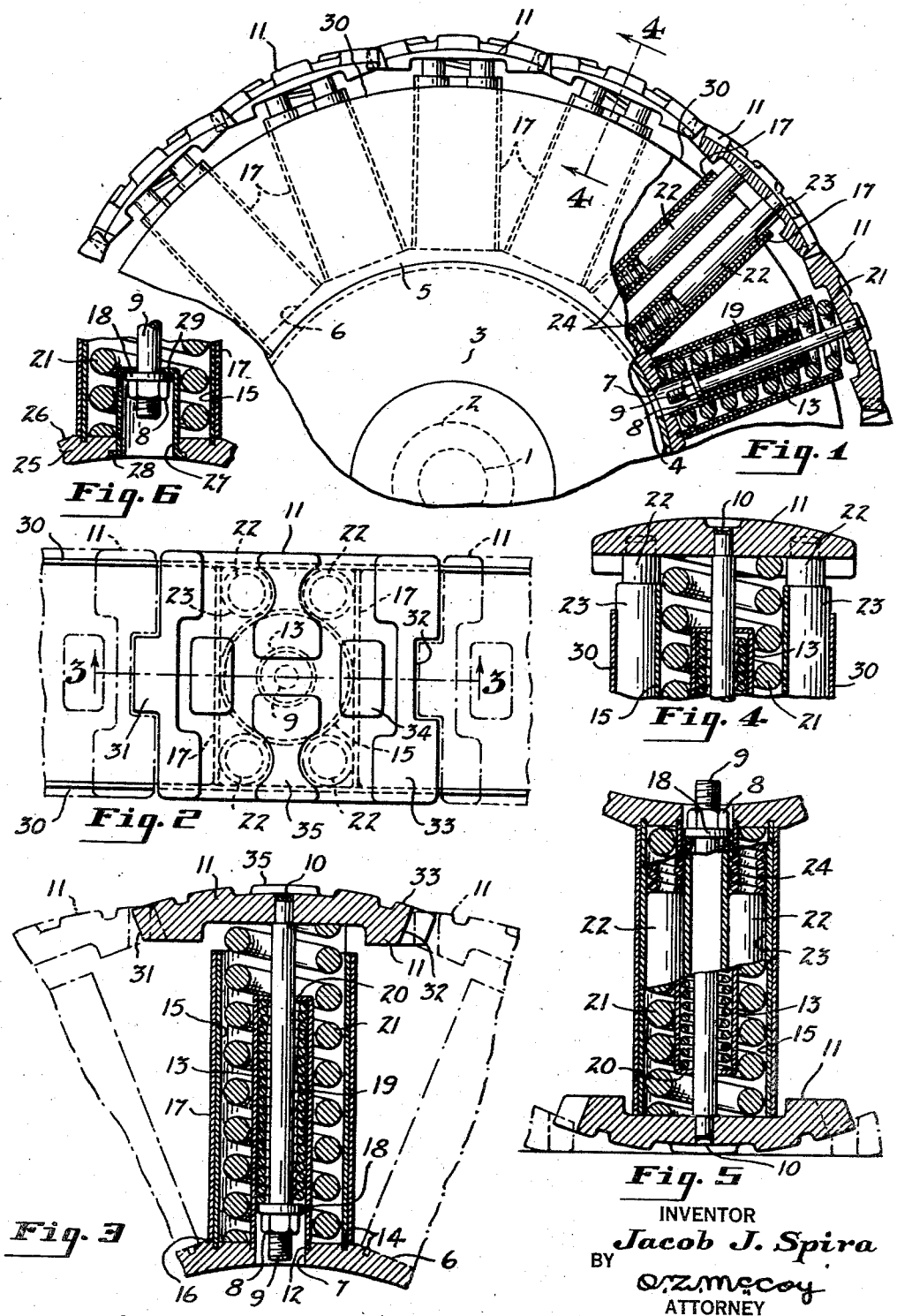

2,417,095

UNITED STATES PATENT OFFICE 2,417,095

VEHICLE WHEEL

Jacob J. Spira, Cleveland, Ohio, assignor of two-thirds to Samuel O. Siegal and Edward I. Siegal, Cleveland, Ohio Application July 17, 1942, Serial No. 451,273

15 Claims. (Cl. 152—16)

1

This invention relates to vehicle traction wheels for use in heavy duty, warfare, and the like, and particularly to a wheel having a resilient metal tread.

The objects of the present invention include the provision of an improved rugged metal wheel having resilient properties and that is built of simply designed and strong parts that are capable of prolonged service under rigorous treatment without such arresting of their functions as to impair the continued use of the wheel short of its actual destruction. Provision is made for the rapid removal and the replacement of an exposed part of the wheel that may be injured by impact, shell fire, or the like, that may exceed the mechanical strength of the material of which the part is made, thereby minimizing the probability of the loss of a vehicle equipped with wheels that embody the present invention thru the mechanical failure of the wheels that support the vehicle.

With the above and other objects in view, that will be apparent to those who are skilled in the art to which the present invention belongs from the following discussion, an illustrative embodiment of the present invention is disclosed in the accompanying drawing, wherein:

Fig. 1 is a fragmentary elevation of a portion of a wheel that embodies the invention that is disclosed herein, with parts broken away and in section thru the axes of the guide rods 22 in one traction unit at the left and thru the axis of the bolt 9 in the adjacent traction unit at the right; to better illustrate the mechanical construction thereof;

Fig. 2 is a fragmentary plan view of a tread member that is a unit of the tread with which the wheel that is shown in Fig. 1 is provided;

Fig. 3 is an elevational section, taken along the median line of the wheel and along the line 3—3 of Fig. 2;

Fig. 4 is a fragmentary transverse or axial section, taken along the line 4—4 of Fig. 1;

Fig. 5 is a section thru a unit of the device with parts broken away thru the axis of the bolt 9 at the top and bottom and thru the axis of the guide rods 22 therebetween to illustrate the action of the pins and cushion springs; and Fig. 6 is a modified support for the compression spring tie member.

The illustrative wheel that is shown in the accompanying drawing is journaled in any desired manner on an axle 1 with a wheel hub 2 and disc 3 extending radially outwardly thereof to a rim 4 of the wheel.

2

A tread supporting member 5 having an annular inner surface is preferably removably mounted on the wheel rim 4 and is secured thereto in any desired manner, as by bolts, not shown, or the like. The outer portion of the tread supporting member 5 has a plurality of lands 6 along the periphery thereof, each of which lands 6 is apertured centrally thereof at 7, for providing wrench access therethru to a nut 8 that threads on a bolt 9 that is permanently secured in any desired way, as by the weld 10, or the like, to a tread member 11. The lands 6 are rabbeted at 12 along the radially outer edge of the apertures 7 to receive the radially inner end of a cylinder or sleeve 13 which is secured to the lands around the aperture 7 in any suitable way, as by being welded in the rabbet 12, or the like. Each land 6 is also preferably grooved at 14 in a circular groove to house the radially inner end of a compression spring sleeve 15 that is permanently secured therein by welding or the like. The radially inner edges of reinforcing plates 17 are welded at 16 or otherwise permanently secured axially across the lands 6. The reinforcing plates 17 may be welded or not, as preferred, along their lines of contact with the compression spring sleeves 15, for augmenting the mechanical strength of these members. Suitable means, such as the washer 18, or the like, on the bolt 9, provides a spring seat for the radially inner end of a restraining spring 19 that is housed in the sleeve 13. The sleeve 13 is closed at its radially outer end by suitable means, such as by the flange 20, or the like, to provide a radially outer spring seat for the restraining spring 19 and to serve as a guide for the bolt 9 which passes thru the center of the flange 20.

The tread members 11 are resiliently or yieldingly maintained in their normal or radially outermost position by suitable means, such as by the load carrying compression springs 21, or the like, that are housed within the compression spring sleeves 15. Each compression spring 21 seats at its radially inner end on the land 6 and seats at its radially outer end on the radially inner face of the tread member 11.

The tread members 11 are individually provided with preferably a plurality of depending guide rods 22 that have their radially outer ends permanently anchored in the tread member 11, as by seating in rod receiving apertures in which the rod ends are permanently secured, as by welding or the like. Each guide rod 22 is preferably slidably supported thruout its periphery by being disposed within and by making a closely fitting sliding engagement with one of the guide rod sleeves 23. The guide rod sleeves 23 have their radially inner ends seated in suitable circular grooves in the lands 6 and are welded therein. The guide rod sleeves 23 are preferably welded along their lines of contact with the reinforcing plates 17 and with the compression spring sleeve 15 for firmness and strength. The reinforcing plates 17 may, if desired, be welded intermediate their ends to the compression spring sleeve 15 and be welded at each of their axial ends to the side plates 30 where a permanent assembly with the side plates is desired. The side plates 30 may be omitted, if preferred, so that the inwardly disposed parts of the device are more accessible for repair, in which construction the reinforcing plates 17 preferably terminate axially at their weld line with the guide rod sleeves 23, or they also may be omitted from the assembly, if preferred. Suitable means, such as the guide rod cushioning compression springs 24, or the like, that are disposed within the guide rod sleeves 23 and that are interposed between the ends of the guide rods 22 and the lands 6, assist in yieldingly or resiliently supporting the tread member 11 thru the guide rods 22 when the compressive strength of the spring 21 is exceeded. As illustrated in Figs. 1, 2 and 3, each tread 11 has a tongue 31 at one end which extends into a groove 32 in the preceding tread and a groove 32 at its opposite end which receives the tongue 31 of the following tread when the wheel is rotating in a counterclockwise direction. This arrangement improves the traction of the treads and reduces the possibility of impediments, such as rock, gravel, or the like, from interfering with their free movement. Each tread is also provided with a plurality of axial strips 33, knobs 34, and waisted strips 35 on their traction faces for improving their traction grip on the roadway.

A modified support for the compression spring tie member is shown in Fig. 6 of the accompanying drawing, wherein the restraining spring is omitted. In this construction the tread supporting member 25 carries a plurality of lands 26 along its radially outer face. Each land 26 is apertured at substantially its center and the sleeve 27 is permanently secured therein, as by having the radially outturned flange 28 part thereof seated in the rabbeted radially inner edge of the aperture and welded therein. The sleeve 27 has the radially inturned flange 29 at its radially outer end against which the washer 18, that the nut 8 retains on the bolt 9, is engaged to maintain the compression spring 21 shorter than its free length.

In operation, as the wheel rotates, each of the tread members 11 in turn assumes the load, as shown in Fig. 5, wherein the compression spring 21 is under maximum load and the coils of the restraining spring 19 are slightly separated. As the load is removed, the compression spring 21 expands to its normal degree of compression against the yielding force of the restraining spring 19 and the system returns to its normal balance.

In the event that it becomes desirable to replace any tread member 11, the nut 8 and the washer 18 are removed thru the aperture 7 that opens thru a corresponding aperture in the rim 4 of the disc 3, the faulty tread member 11 is pulled radially away from the assembly, a new tread member is inserted in its place and the washer 18 and the nut 8 are replaced and tightened to the proper degree.

Where the side plates 30 are not used, and where the reinforcing plates 17 are omitted, all parts of the device are openly accessible to workers and any injured part of the device is quickly bent back into shape or removed and replaced with new parts. When used in sand, as in desert country and the like, the loose particles of sand rattle thru and out of the parts of the device without damage to the parts and with a minimum of wear. The side plates 30 may be attached to the construction permanently or they may be slit radially into two or more sections for ease of removal, not shown, and bolted thereon by bolts, not shown, passing thru holes in the radially inner edge of the plate 30 and threading into the tread supporting member 5, as preferred.

It is to be understood that the constructions of the device and of the individual parts thereof, that are disclosed herein and that are shown in the drawing, are submitted for the purposes of description and illustration of one embodiment of the invention and that various modifications may be made therein without departing from the invention as defined in the appended claims.

What I claim is:

1. A vehicle wheel comprising a tread supporting member having hollow sleeves extending outwardly therefrom, a plurality of treads, each having guide rods depending therefrom with the free end of each guide rod being receivable within one of said sleeves, a main compression spring interposed between said supporting member and each tread for bearing the major portion of the load when the tread engages a road, a cushioning spring arranged in each of said sleeves for bearing a portion of the load when the main spring is compressed beyond a predetermined extent, and a restraining spring for limiting the outward movement of the tread under the force of said compression and cushioning springs when the tread is disengaged from the road.

2. A vehicle wheel comprising a tread supporting member having sleeves extending radially outwardly therefrom, each having a cushioning spring disposed therein, a plurality of treads, each having guide rods depending therefrom with the free end of each guide rod being receivable within one of said sleeves and seating upon the cushioning spring arranged therein, a main compression spring interposed between said tread supporting member and each of said treads and being compressible to bear the main portion of the load when the tread associated therewith engages the road and said cushioning springs being adapted to bear a portion of the load when the main spring is compressed beyond a predetermined extent, a sleeve arranged within said compression spring having its inner end affixed to the tread supporting member and a flange at its outer end, a restraining spring disposed in the last mentioned sleeve with its outer end bearing against said flange, and tie means secured at its outer end to said tread and having its inner end engaging the inner portion of the restraining spring for maintaining said restraining spring in yielding resilient opposition to said compression and cushioning springs when the tread is disengaged from the road.

3. A vehicle wheel comprising a tread supporting member, a plurality of treads spaced radially outwardly from said supporting member with adjacent treads being provided with a tongue and slot arrangement to improve the traction of the treads and prevent impediments from interfering with the free movement thereof, a resilient member interposed under compression between each of said treads and said supporting member for imparting resilience to said treads when under load, a tie member indirectly connecting each of said treads with said supporting member for limiting radial outward movement of each tread when the tread is disengaged from the road, a restraining spring associated with each of said tie members for opposing the outward force of the resilient member associated with each tread when the tread is disengaged from the road, and a plurality of slip-fit reciprocating members interposed between each of said tread members and said supporting member for restricting the motion of said treads with respect to said supporting member circumferentially thereof.

4. A vehicle wheel comprising a tread supporting member having a plurality of lands upon its radially outer face and said member being apertured centrally of said lands, a tread disposed radially outwardly from each of said lands, a plurality of opposed and balanced springs interposed between each of said treads and said lands for yieldingly maintaining said treads in a predetermined spaced relation with respect to said lands when the tread is disengaged from the road, a plurality of sleeves secured at their radially inner ends to each of said lands and individually housing said springs for supporting said springs against circumferential and lateral tilting thereof, and a removable securing means accessible through each of the apertures in said supporting members for assembling and adjusting radially said treads and said springs.

5. A vehicle wheel comprising a circumferentially continuous tread supporting member having a plurality of substantially flat lands on its outer face and said member being apertured substantially centrally of said lands, a sleeve secured to each of said lands and extending outwardly in a direction substantially normal thereto, a plurality of treads disposed radially outwardly from said supporting member and each tread overlying one of the lands on said supporting member, resilient means arranged in each of said sleeves and yieldingly forcing said treads radially away from said supporting member when the tread is disengaged from the road, and means for maintaining said treads in association with said supporting member against the action of said resilient means including a plurality of bolts, each having its radially outer ends secured in one of said treads and having a nut on its inner end, means associated with said supporting member and said nuts for preventing outward movement of said bolts and said nuts being accessible through said apertures for radially adjusting individually said tread members with respect to said supporting member.

6. A vehicle wheel comprising a tread supporting member having hollow portions opening radially outwardly therefrom, a plurality of individual treads disposed radially outwardly from said tread supporting member and each being movable inwardly and outwardly independently of the other treads, depending portions secured to each of said treads for reciprocation in said hollow portions and being guided for radial movement thereby, a spring interposed between said supporting member and each of said treads and each spring being compressible to bear at least the main portion of the load when the tread with which it is associated engages the road, and means for limiting the outward movement of each of said treads when it is disengaged from the road.

7. A vehicle wheel comprising a tread supporting member having sleeves extending radially outwardly therefrom adjacent the inner and outer margins thereof, a plurality of individual tread members disposed outwardly of said supporting member and each being movable inwardly and outwardly independently of the other tread members, rods secured to and extending radially inwardly from the outer and inner margins of each of said tread members for reciprocation in said tubes and being guided for radial movement thereby during the inward and outward movement of each tread, a spring interposed between said supporting member and each of said treads which engages the central portion of the tread with which it is associated and which is of sufficient size to bear at least the main portion of the load when said tread engages the road, and means for limiting the outward movement of each of said treads when it is disengaged from the road.

8. A vehicle wheel comprising a tread supporting member, a plurality of treads spaced outward from the tread-supporting member, a spring interposed between each of said treads and the tread supporting member which is compressed to bear at least the main portion of the load when the tread engages a road, said supporting member being provided with an aperture in alignment with each tread, means for limiting the outward movement of each of said treads when it is disengaged from the road including a rod having one end connected to each of said treads and removable fastening means associated with the other end of said rod and said supporting member, and said fastening means being accessible for removal through the opening in alignment with the tread, whereby said tread may be easily removed and another tread inserted in its place.

9. A vehicle wheel comprising a tread supporting member having hollow portions opening radially outwardly therefrom, a plurality of individual treads disposed radially outwardly from said tread supporting member and each being movable inwardly and outwardly independently of the other treads, depending portions secured to each of said treads for reciprocation in said hollow portions and being guided for radial movement thereby, a spring interposed between said supporting member and each of said treads and each spring being compressible to bear at least the main portion of the load when the tread with which it is associated engages the road, and resilient means for maintaining each of said springs under compression and for opposing its outward movement when the tread with which it is associated is disengaged from the road.

10. A vehicle wheel comprising a tread supporting member having apertures therein, a plurality of individual treads disposed radially outwardly from said tread supporting member and each tread being movable inwardly and outwardly independently of the other tread, a spring interposed between said supporting member and each of said treads and each of said springs being compressible when the tread with which it is associated engages the road, and adjustable means arranged outwardly from said supporting member when the tread is disengaged from the road for limiting the outward movement of each of said treads and said adjustable means being accessible through one of said apertures in the tread supporting member.

11. A vehicle wheel comprising a tread supporting member, a plurality of individual treads disposed radially outwardly from said tread supporting member and each tread being movable inwardly and outwardly independently of the other treads, a spring interposed between said supporting member and each of said treads and each of said springs being compressible when the tread with which it is associated engages the road, and adjustable resilient means for limiting the outward movement of each of said treads when it is disengaged from the road.

12. A vehicle wheel comprising a tread supporting member having apertures therein, a plurality of individual treads disposed radially outward from said tread supporting member and each tread being movable inwardly and outwardly independently of the other treads, a spring interposed between said supporting member and each of said treads and each of said springs being compressible when the tread with which it is associated engages the road, resilient means for limiting the outward movement of each of said treads when it is disengaged from the road and each of said resilient means being adjustable by means accessible through one of said apertures.

13. A vehicle wheel comprising a tread supporting member having sleeves extending radially outward from the inner and outer margins thereof, a plurality of individual tread members disposed outwardly of said supporting member and each being movable inwardly and outwardly independently of the other tread members, rod secured to and extending radially inwardly from the outer and inner margins of each of said treads for reciprocation in said sleeves and being guided for radial movement thereby during the inward and outward movement of each tread, a spring interposed between said supporting member and each of said treads which engages the central portion of the tread with which it is associated and which is of sufficient size to bear at least the main portion of the load when said tread engages the road, means for limiting the outward movement of each of said treads when it is disengaged from the road, and means for reinforcing said sleeves.

14. A vehicle wheel comprising a rim, a circumferentially continuous tread supporting member engaging said rim and having a plurality of substantially flat lands on its radially outer face, a pair of tubular sleeves extending radially outward from each of said lands adjacent its inner margin and a pair of tubular sleeves extending radially outwardly from each of said lands adjacent its outer margin, a movable tread disposed radially outward from each of said lands, a pair of rods on the outer and inner margins of each of said treads, each of which reciprocates in a tube projecting from said lands during inward and outward movement of said tread, a spring disposed between each of said lands and the tread disposed radially outward therefrom which spring is compressed when the tread with which it is associated engages the road, means for limiting the outward movement of said treads when the tread is disengaged from the road, and means for reinforcing said sleeves.

15. A vehicle wheel comprising a tread supporting member, a plurality of individual treads disposed radially outwardly from said tread supporting member and each tread being movable inwardly and outwardly independently of the other treads, a spring interposed between said supporting member and each of said treads and being compressible when the tread engages the road, resilient restraining means for maintaining each of said springs under compression and opposing its outward movement when the tread with which the spring is associated is disengaged from the road, and means associated with the tread supporting member and said resilient means for permitting gradual release of tension of said resilient means during the complete inward movement of said tread and for gradually compressing said restraining means during the complete outward movement of said tread.

JACOB J. SPIRA.

REFERENCES CITED

The following references are of record in the file of this patent:

UNITED STATES PATENTS

| Number | Name | Date |
| --- | --- | --- |
| 1,058,518 | Anderson | Apr. 8, 1913 |
| 1,087,225 | Fahrney | Feb. 17, 1914 |
| 1,279,754 | Peltier | Sept. 24, 1918 |
| 1,114,583 | Conklin et al. | Oct. 20, 1914 |
| 970,569 | Strube | Sept. 20, 1910 |
| 950,299 | Overman | Feb. 22, 1910 |
| 1,158,977 | Brundage | Nov. 2, 1915 |
| 927,578 | Murrey | July 13, 1909 |